United States Patent
Khatri et al.

(10) Patent No.: US 11,775,690 B2
(45) Date of Patent: Oct. 3, 2023

(54) SYSTEM AND METHOD FOR SUPPORTING MULTIPLE INDEPENDENT SILICON-ROOTED TRUSTS PER SYSTEM-ON-A-CHIP

(71) Applicant: DELL PRODUCTS, LP, Round Rock, TX (US)

(72) Inventors: Mukund Khatri, Austin, TX (US); Eugene Cho, Austin, TX (US)

(73) Assignee: Dell Products L.P., Round Rock, TX (US)

(*) Notice: Subject to any disclaimer, the term of this patent is extended or adjusted under 35 U.S.C. 154(b) by 352 days.

(21) Appl. No.: 17/109,390

(22) Filed: Dec. 2, 2020

(65) Prior Publication Data

US 2022/0171884 A1    Jun. 2, 2022

(51) Int. Cl.
| | |
|---|---|
| *G06F 15/177* | (2006.01) |
| *G06F 9/00* | (2006.01) |
| *G06F 21/71* | (2013.01) |
| *H04L 9/08* | (2006.01) |
| *H04L 9/14* | (2006.01) |
| *G06F 21/62* | (2013.01) |
| *G06F 21/57* | (2013.01) |
| *G06F 9/4401* | (2018.01) |

(52) U.S. Cl.
CPC ............ *G06F 21/71* (2013.01); *G06F 9/4401* (2013.01); *G06F 21/572* (2013.01); *G06F 21/62* (2013.01); *H04L 9/0891* (2013.01); *H04L 9/0897* (2013.01); *H04L 9/14* (2013.01); *G06F 2221/033* (2013.01)

(58) Field of Classification Search
CPC ...... G06F 21/71; G06F 9/4401; G06F 21/572; G06F 21/62; G06F 2221/033; G06F 21/6218; H04L 9/0891; H04L 9/0897; H04L 9/14
See application file for complete search history.

(56) References Cited

U.S. PATENT DOCUMENTS

| | | | | |
|---|---|---|---|---|
| 6,959,090 B1 * | 10/2005 | Alve | .................. | H04N 21/4334 |
| | | | | 713/160 |
| 8,285,980 B1 * | 10/2012 | Feng | ..................... | H04L 9/0897 |
| | | | | 713/1 |
| 10,599,849 B2 | 3/2020 | Nijhawan et al. | | |
| 10,698,696 B2 | 6/2020 | Raghuram et al. | | |
| 11,461,475 B2 * | 10/2022 | Kim | ..................... | H04L 9/0869 |

(Continued)

*Primary Examiner* — Xuxing Chen
(74) *Attorney, Agent, or Firm* — Larson Newman, LLP

(57) ABSTRACT

A compute device of an information handling system includes a security chip. The security chip includes a programmable read only memory, which in turn includes multiple one-time programmable slots and a one-time programmable slot counter. A first slot of the one-time programmable slots stores a first group of keys associated with a first entity of the security chip. A second slot of the one-time programmable slots stores a second group of keys associated with a second entity of the security chip. The one-time programmable slot counter includes multiple entries. Each of the entries is associated with a different one of the one-time programmable slots. Each of the entries is preset to a first value. The one-time programmable slot counter is only able to count in one direction. A first entry of the entries is updated to invalidate the second group of keys associated with the second entity.

20 Claims, 5 Drawing Sheets

(56) References Cited

U.S. PATENT DOCUMENTS

| | | | |
|---|---|---|---|
| 2015/0100792 A1* | 4/2015 | Hartley | H04N 21/4432 |
| | | | 713/189 |
| 2015/0312036 A1* | 10/2015 | Kumar | H04L 9/0866 |
| | | | 380/44 |
| 2016/0078251 A1* | 3/2016 | Soja | G06F 21/72 |
| | | | 713/193 |
| 2016/0162669 A1* | 6/2016 | Mikhailov | G06F 21/10 |
| | | | 713/2 |
| 2019/0325167 A1* | 10/2019 | Hershman | G06F 3/0604 |
| 2020/0007332 A1* | 1/2020 | Girkar | G06F 21/72 |
| 2020/0089625 A1* | 3/2020 | Wallach | G06F 12/1475 |
| 2020/0233964 A1* | 7/2020 | Hocker | G06F 21/64 |
| 2020/0293667 A1* | 9/2020 | Kim | G06F 12/1441 |
| 2022/0035926 A1* | 2/2022 | Tsai | G06F 21/62 |

\* cited by examiner

SYSTEM AND METHOD FOR SUPPORTING MULTIPLE INDEPENDENT SILICON-ROOTED TRUSTS PER SYSTEM-ON-A-CHIP

FIELD OF THE DISCLOSURE

The present disclosure generally relates to information handling systems, and more particularly relates to supporting multiple independent silicon-rooted trusts per system-on-a-chip.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A compute device of an information handling system includes a security chip. The security chip includes a programmable read only memory, which in turn includes multiple one-time programmable slots and a one-time programmable slot counter. A first slot of the one-time programmable slots may store a first group of keys associated with a first entity of the security chip. A second slot of the one-time programmable slots may store a second group of keys associated with a second entity of the security chip. The one-time programmable slot counter includes multiple entries. Each of the entries may be associated with a different one of the one-time programmable slots. Each of the entries may be preset to a first value. The one-time programmable slot counter is only able to count in one direction. A first entry of the entries may be incremented to invalidate the second group of keys associated with the second entity.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
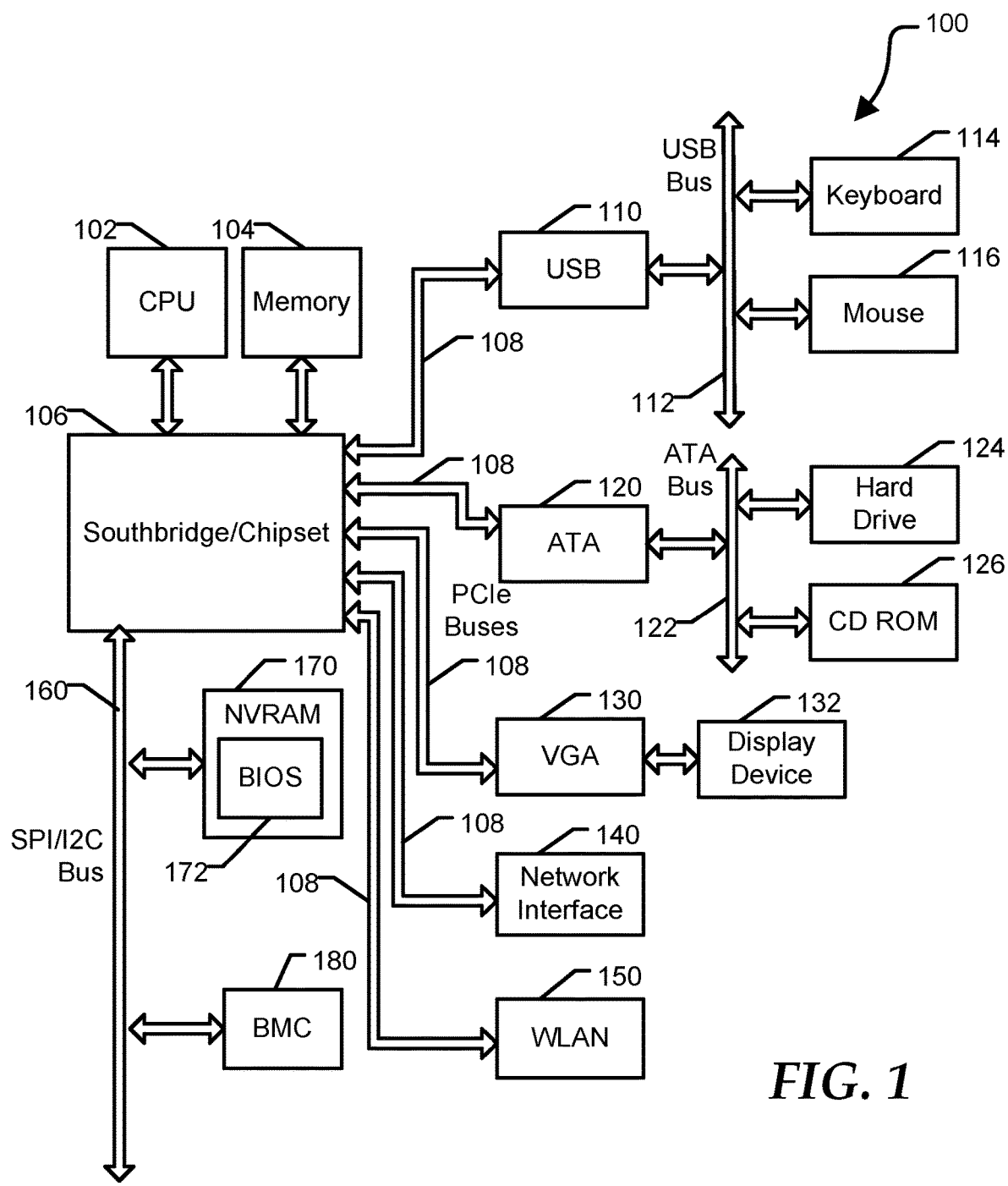
FIG. 1 is a block diagram of a general information handling system according to an embodiment of the present disclosure.

FIG. 1 illustrates a general information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 including a processor 102, a memory 104, a southbridge/chipset 106, one or more PCIe buses 108, a universal serial bus (USB) controller 110, a USB 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, and a baseboard management controller (BMC) 180. In an example, chipset 106 may be directly connected to an individual end point via a PCIe root port within the chipset and a point-to-point topology as shown in FIG. 1. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of southbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

In an example, information handling system 100 may be any suitable device including, but not limited to, information handling system 100 and servers 112, 114, and 116 of FIG. 1. Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

Figure 2:
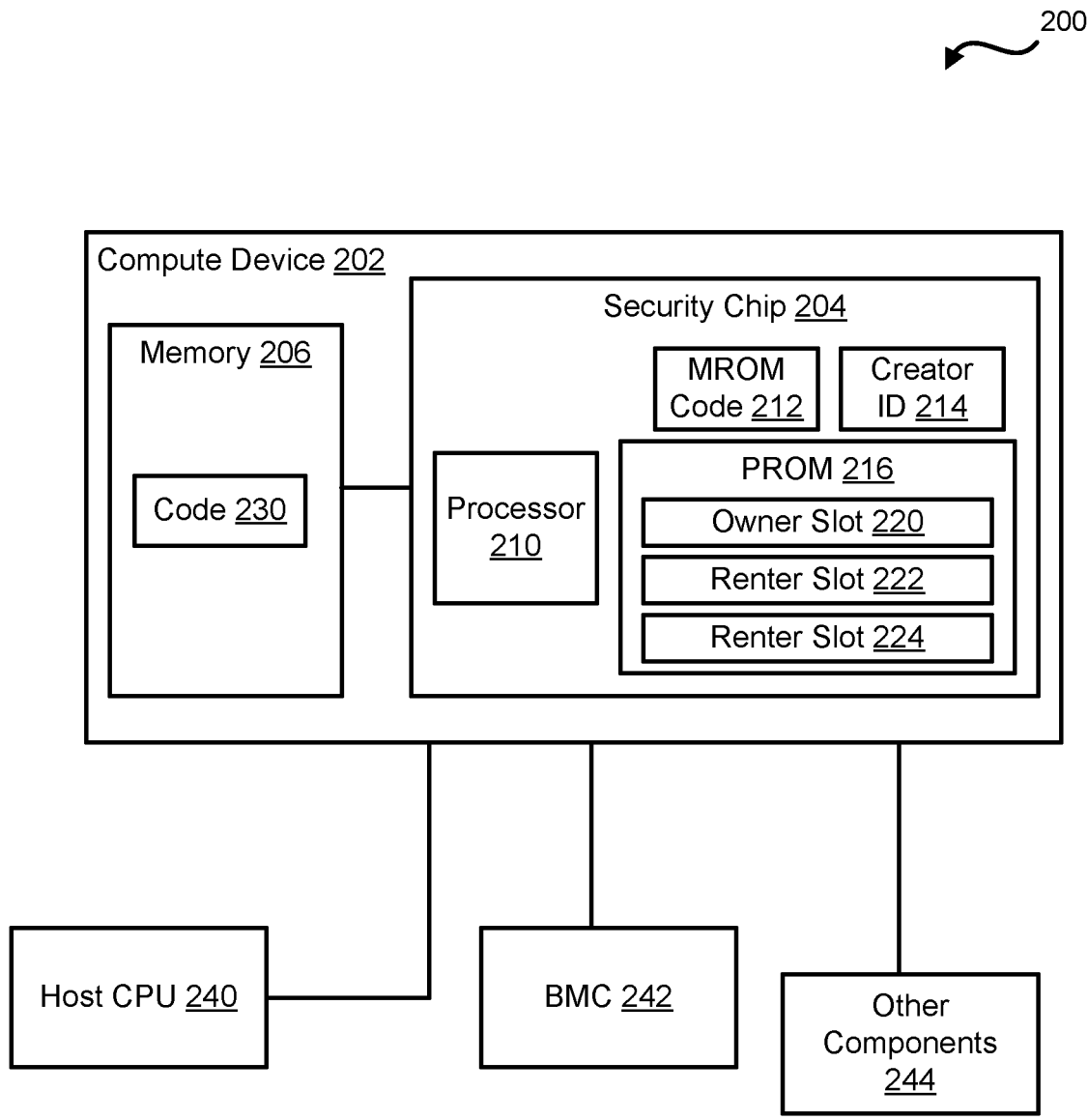
FIG. 2 is a diagram of a portion of a compute device of an information handling system according to at least one embodiment of the present disclosure.

FIG. 2 illustrates an information handling system 200 including a compute device 202. Information handling system 200 may be any suitable system, such as information handling system 100 of FIG. 1. Compute device 202 includes a security chip 204 and a memory 206. In an example, security chip 204 may be a system-on-a-chip (SoC). In certain examples, security chip 204 may be any suitable security chip including, but not limited to, a dedicated security chip, and a root of trust (RoT) chip. Security chip 204 includes a processor 210, a mask read-only memory (MROM) code 212, a creator ID 214, and a programmable read only memory (PROM) 214. In an example, PROM 216 includes one-time programmable memory locations or slots to store any suitable data associated with security chip 204. Memory 206 may be any suitable type of flash memory including, but not limited to, an electronically erasable programable read only memory. Memory 206 may be utilized to store one or more sets of code 230. Other components 244 may include any suitable components of compute device 202 including, but not limited to, a graphics processing unit, a host bus adaptor, a cryptography offload device, a power supply unit, and a network interface card. In certain examples, compute device 202, via security chip 204, may perform any suitable operations including, but not limited to, the operations disclosed herein. In an example, compute device 202 may include additional components without varying from the scope of this disclosure.

In an example, a particular manufacturer or silicon creator may build security chip 204, such as a SoC. During the manufacturing process of security chip 204, the manufacturer or creator may program, write, burn, or otherwise permanently store data to within the silicon of the security chip PROM 216 to store mask read-only memory (MROM) code 212. In an example, MROM code 212 is created during the manufacturing of security chip 204 by the manufacturer hardwiring the code within the silicon of the security chip, such that the MROM code may not be changed after being written or programmed. The security chip manufacturer may also store or burn a creator identification (ID) 214 within the silicon of security chip 204. In an example, the creator ID 214 may be utilized by a customer, such as an information handling system manufacturer, of the manufacturer to verify that security chip 204 is an authentic security chip from the security chip manufacturer.

Based on the creator ID 214, the security chip manufacturer or an information handling system manufacturer may store an owner ID within owner slot 220 security chip 204. In an example, the owner ID within owner slot 220 may be a secured boot key to authentic code 232 within memory 206 of BIOS 208. In certain examples, additional data may be stored within owner slot 220 including, but not limited to, a group of keys, and an identity of an entity associated with the group of keys. In an example, the group of keys may include any suitable keys including, but not limited to, a hidden root key (HRK), a secure boot key, and identity keys. HRK may be a symmetric key utilized for local encrypting/decrypting data on the chip. Secure boot keys and identity keys may be utilized to sign code and sign-proof-of-identity challenges. Code 230 may be as associated with an owner entity, and may enable the owner entity to assign particular rights or privileges within compute device 202, such as with respect to security chip 204 and processor 210. In an example, the entity associated with the owner ID within owner slot 220 may be any suitable entity including, but not limited to, a printed circuit board assembly (PCBA), and a PCBA factory of a company that purchases security chip 204 from the manufacturer of the security chip. In certain examples, code 230 may be stored in any suitable location including, but not limited to, memory 206. In an example, code 230 may be written in memory 206 may any suitable manner including, but not limited to, an add-on chip mounted above the security chip 204 and the add-on chip may write the code directly into the memory. Security chip 204 may utilize the group of keys within owner slot 220 to authenticate code 230 associated with the owner entity. Upon code 230 being authenticated, the owner entity may execute the code to perform any suitable operations including, but not limited to, verifying other devices in information handling system 200 that are directly attached to security chip 204 including, but not limited to, host CPU 240, BMC 242, and components 244.

In previous information handling systems, owner slot 220 may be invalidated when ownership is transferred to another entity. However, these actions may reduce the ability of end users/customers to have total control of firmware, identity, and keys without compromising supply-chain assurances for mainstream products of the information handling system manufacturer. For example, in previous information handling systems a different SoC or motherboard with a different security or RoT chip would need to be manufactured for different products of the information handling system manufacturer. Compute device 202 may improve information handling system 200 by enabling a single security chip, such as security chip 204, to be produced. This single security chip may be utilized across multiple business lines of the information handling system manufacturer, and include different firmware, identity and keys based on the business line or entity utilizing the security chip.

In an example, owner slot 220 is protected so that this slot of PROM 216 may not be invalidated. Code 230 associated with the entity of owner slot 220 may be able to create and remove one or more renter entities of security chip 204 by fusing and invalidating one or more additional slots within PROM 216, such as renter slots 222 and 224. The operations of creating and invalidating different renter entities will be described with respect to FIGS. 3-5 below.

Figure 3:
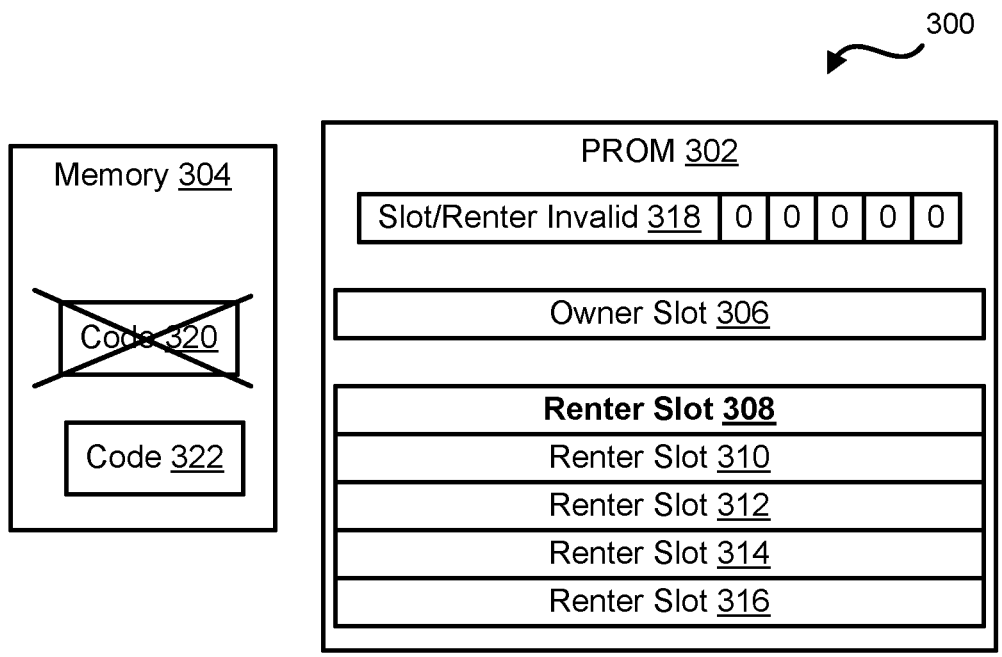
FIGS. 3-5 are diagrams of storage locations within a programmable read only memory of a compute device according to at least one embodiment of the present disclosure.
Figure 4:
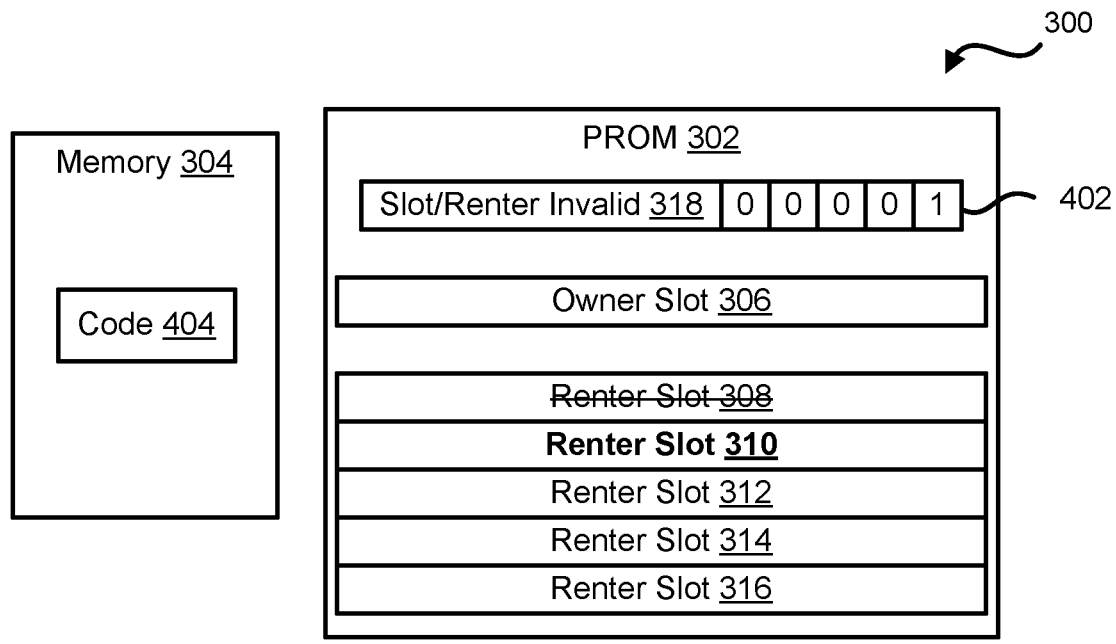
Figure 5:
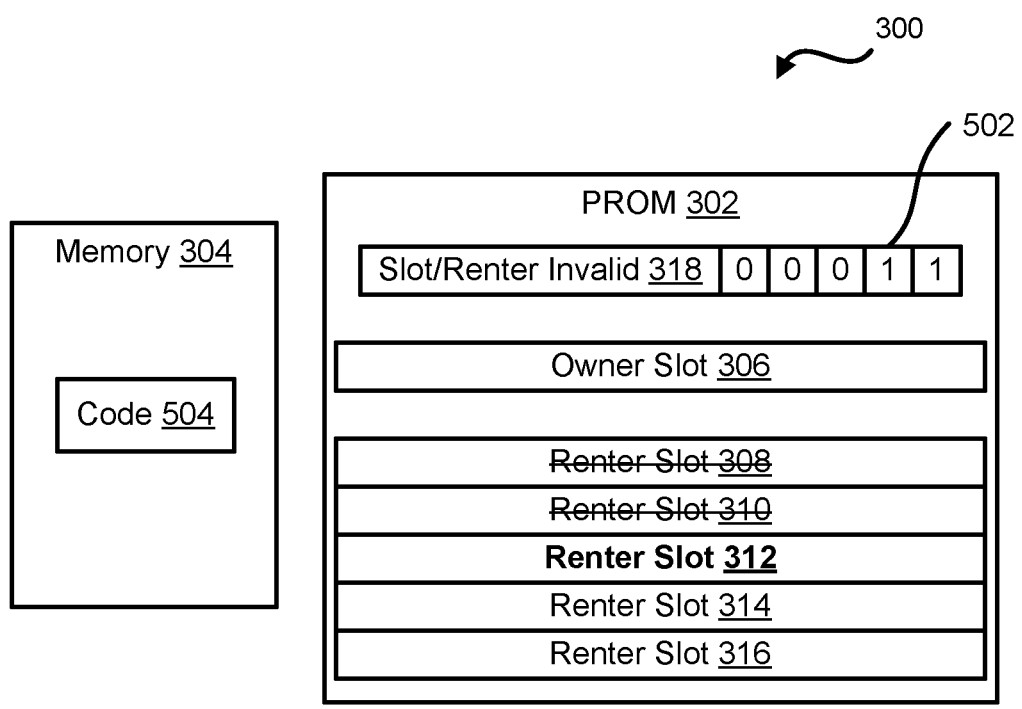

FIGS. 3-5 illustrate diagrams a compute device 300 including a PROM 302 and a memory 304. In an example, PROM 302 includes multiple one-time programmable memory slots according to at least one embodiment of the present disclosure. In an example, PROM 302 may be substantially similar to PROM 216 on security chip 204 of compute device 202 in FIG. 2. PROM 302 an owner slot 306, renter slots 308, 310, 312, 314, 316 (308-316), and a slot/renter invalid counter 318. In an example, each of owner slot 306 and renter slots 308-316 may be one-time programmable slots of PROM 302. PROM 302 may include additional storage locations without varying from the scope of this disclosure. For example, PROM 302 may include additional renter slots, and the number of renter slots may be limited only based on the size of PROM 302. Slot/renter invalid counter 318 may be a counter that is only able to count in one direction. For example, each entry within slot/renter invalid counter 318 may be one-time programmable entries that cannot be erased, such that the slot/renter invalid counter may be incremented by a next in order entry being set. In an example, compute device 300 may include additional components over those illustrated in FIG. 3 without varying from the scope of this disclosure.

As described above with respect to FIG. 2, during manufacturing of a security chip, such as security chip 204 of FIG. 2, data may be fused or one-time programmed in owner slot 306. In an example, the data fused in owner slot 306 may include, but is not limited to, one or more secure boot keys, identity keys, and a HRK. The secure boot keys in owner slot 306 may be utilized to validate code associated with an entity identified within owner slot 306. In an example, the code validated by the secure boot keys within owner slot 306 may be code 320 within memory 304. In certain examples, the code associated with the entity of owner slot 306 may include instructions for fusing and invalidating renter slots 308-316. Exemplary pseudo-code within code 232 may be as follows:

```
If (Vacancy){
    //make SoC useless, owner only
    //should program renter slots
    disable_everything_but_slots( );
    SecureBoot(OWNERSLOT)
} else {
    lock_fuses( );
    SecureBoot(&selectedRenter);
}
```

In the pseudo-code above, vacancy may be defined as no valid key being found in any of renter slots 308-316, such that the silicon-rooted trust of the security chip is passed back to owner slot 306 or ownership of the security chip has never been transferred to a renter. In an example, a "valid key"=(non zero && !slotinvalid), wherein the non zero refers to owner controls and the ! slotinvalid refers to renter controls.

In an example, when code 320 associated with owner slot 306 is executed, data for a renter entity may be fused in renter slot 308 as illustrated by the label for renter slot 308 being 'bolded' in FIG. 3. When renter slot 308 is fused with data, new code, such as code 322 associated with the renter entity of renter slot 308, may replace code 320 within memory 304. In an example, the replacement of code 320 with code 322 is illustrated by code 320 having an 'X' over it in FIG. 3. The data fused in renter slot 308 may include, but is not limited to, a group of keys, such as one or more secure boot keys, identity keys for the renter entity, and a HRK. In an example, the group of keys in renter slot 308 may include the silicon-root trust key to validate code 322 associated with the renter entity of renter slot 308. The secure boot keys in renter slot 308 enable the renter entity associated with the renter slot execute code 322 in a processor, such as processor 210 of FIG. 2. In certain examples, code 322 may enable processor 210 of security chip 204 to perform one or more secure boot operations of an information handling system, such as information handling system 200 of FIG. 2.

In an example, privileges granted to the owner entity and each renter entity may be exclusive to the owner and renter. For example, owner entity associated with owner slot 306 may only be able to execute code 320 based on the group of keys in owner slot 306 only being able to validate code 320. In an example, in response to code 320 being validated the owner entity associated with owner slot 306 may have write access to fuse a group of keys for silicon rooted-trust within each of the one-time programmable slots, such as renter slots 308-316. The owner entity may also have write access to slot/renter invalid counter 318 to invalidate particular renter slots 308-316 and thereby remove privileges of the associated renter entity.

In response to the group of keys within a particular renter slot, such as renter slot 308, validating code 322, the associated renter entity may be granted particular renter privileges. Privileges of the renter entities may include read and write access to all peripherals of a compute device, such as other CPU 240, BMC 242, and other components 244 of compute device 202 within information handling system 200 of FIG. 2. Additionally, code 322 may enable a renter entity associated with renter slot 308 remove their own privileges and invalidate the group of keys within renter slot 308. However, renter entities are not able to fuse data in other renter slots. The clear division of privileges between the owner entity and the renter entities enable an access-control mechanism for each entity. For example, if a renter entity is compromised, the owner entity is not affected. Similarly, if the owner entity is compromised, the current renter entity is not affected.

Referring now to FIG. 4, one or more suitable operations may be performed to invalidate renter slot 308. In an example, the invalidation of the group of keys within renter slot 308 may be performed by the owner entity or the renter entity. Renter slot 308 may be invalidated for any suitable reason including, but not limited to, the renter entity needed to be remanufactured, and the renter entity needed to be decommissioned. In an example, the renter entity or owner entity may invalidate renter slot 308 to prevent the renter entity to boot code 322, verify the renter entity identity, and encrypt or decrypt data using the HRK within renter slot 308.

In certain examples, a processor executing code 322 associated with a renter entity of renter slot 308 may perform one or more operations to invalidate the renter slot. For example, the processor may execute software to directly invalidate the group of key in in the one-time programmable slot associated with the renter entity. In an example, the processor may directly invalidate the group of keys in the one-time programmable slot 308 by incrementing slot counter 318. In certain examples, each time slot counter 318 is updated, a current valid renter slot of the one-time programmable slots 308-316 is invalidated. In an example, the renter entity associated with renter slot 308 may want to invalidate the group of keys within renter slot 308 prior to returning the security chip to the owner entity. In this example, the renter entity may invalidate of the group of keys within renter slot 308 so that the owner entity may not be able to validate code 322. If renter slot 308 is not invalidated prior to the security chip being returned to the owner entity associated with owner slot 306, the owner entity associated with owner slot 306 may invalidate the group of keys within renter slot 308.

Renter slot 308 may be invalidated by incrementing slot counter 318 by any suitable manner, such incrementing entry 402. Renter slot 308 is shown in FIG. 4 as being invalidated by the label renter slot 308 being struck through. In an example, each entry of slot/renter invalid counter 318 may be associated with a different one or renter slots 308-316. In this example, performing a one-time program to increment a particular entry may invalidate the associated renter slot. In an example, none of the entries within slot/renter invalid counter 318 are associated with owner slot 306. In this example, owner slot 306 may not be able to be invalidated, such that whenever code 320 is written in memory 304 the group of keys within owner slot 306 may be utilized to validate code 320.

After renter slot 308 is invalidated, owner entity associated with owner slot 306 may determine whether another entity is able to rent or be provided temporary silicon-rooted trust of a security chip, such as security chip 204 of FIG. 2. In an example, when code 320 associated with owner entity is stored in memory 304 and validated by the group of keys in owner slot 306 is executed, data for the new renter entity may be fused in renter slot 310 as illustrated by the label for renter slot 310 being 'bolded' in FIG. 4. The data fused in renter slot 310 may include, but is not limited to, a group of keys, such as one or more secure boot keys, identity keys for the renter entity, and a HRK for the renter entity. When renter slot 310 is fused with data, code 404 associated with the renter entity of renter slot 310 may be stored within memory 304. In an example, the group of keys in renter slot 310 may be the silicon-root trust key to validate code 404, when a compute device is booted. The secure boot keys enable the renter entity associated with renter slot 310 to execute code 404.

Referring now to FIG. 5, one or more suitable operations may be performed to invalidate renter slot 310. As described above, the invalidation of renter slot 310 may be performed by the owner entity or the renter entity. Renter slot 310 may be invalidated by incrementing invalid counter 318 via writing a value to entry 502. Renter slot 310 is shown in FIG. 5 as being invalidated by the label renter slot 310 being struck through. In an example, performing a one-time program write to entry 502 may invalidate renter slot 310.

After renter slot 310 is invalidated, owner entity may determine whether another entity is able to rent or be provided temporary silicon-rooted trust of a security chip, such as security chip 204 in FIG. 2. In an example, when code 320 associated with owner slot 306 is stored in memory 304 and executed, data for the new renter entity may be fused in renter slot 312 as illustrated by the label for renter slot 312 being 'bolded' in FIG. 5. The data fused in renter slot 312 may include, but is not limited to, a group of keys, such as one or more secure boot keys, identity keys of the renter entity, and a HRK for the renter entity. When renter slot 312 is fused with data, code 504 associated with the renter entity of renter slot 312 may be stored within memory 304. In an example, the secure boot keys in renter slot 312 may be the silicon-root trust key to validate code 504, when a compute device is booted. The secure boot keys enable the renter entity associated with renter slot 310 to execute code 404.

In an example, if the new renter entity associated with renter slot 312 is the same entity as a previous renter entity, such as the renter entity associated with renter slot 308, the data in the new renter slot may be different than the data stored in the previous renter slot. For example, the group of keys, such as the identification keys of the renter entity and the HRK for the renter entity, may be different within the new renter slot.

The number of renter entities that may utilize security chip 204 may be restricted based on space within PROM 216. In an example, this restriction may be mitigated or reduced by using a combination of one-time programmable memory space and of non-volatile storage.

Figure 6:
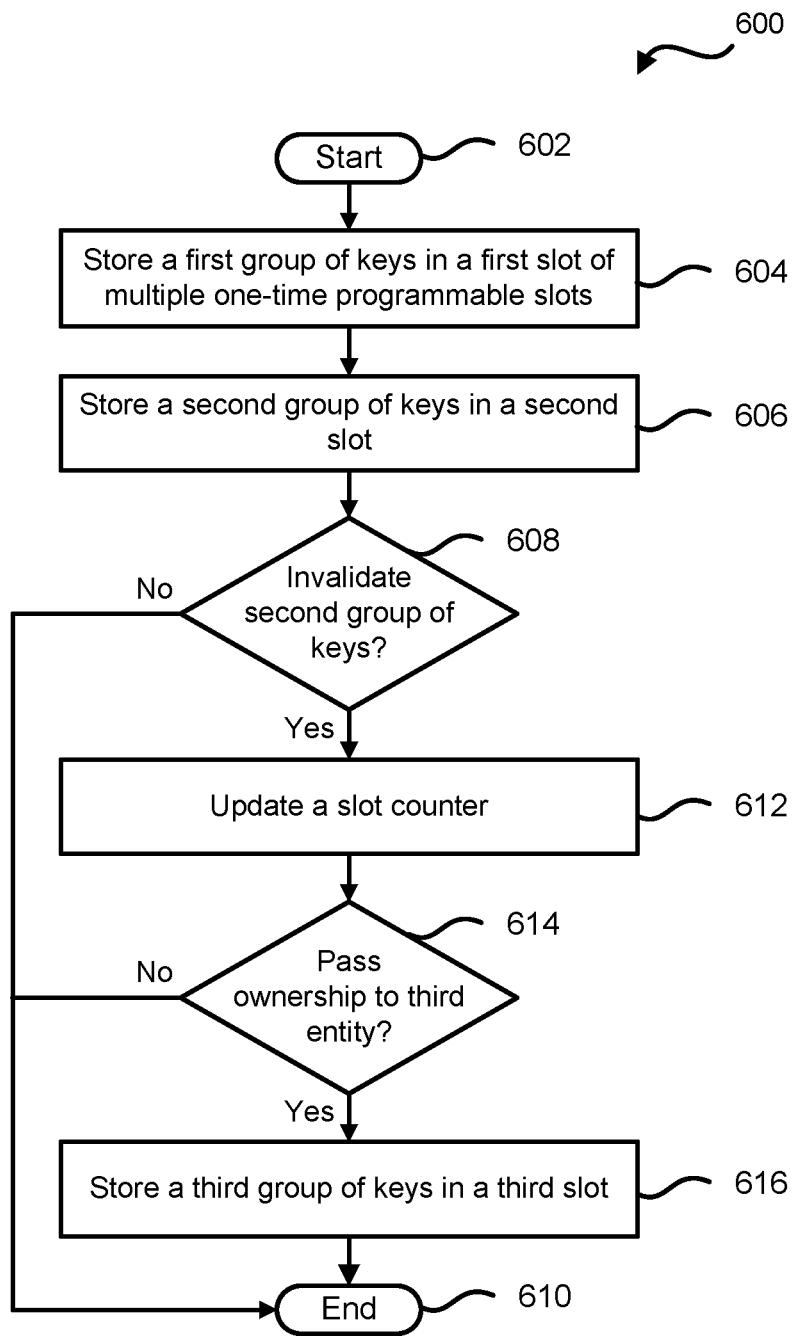
FIG. 6 is a flow diagram of a method for supporting multiple independent silicon-rooted trusts for a security chip according to at least one embodiment of the present disclosure.

FIG. 6 illustrates a flow diagram of a method 600 for supporting multiple independent silicon-rooted trusts for a security chip according to at least one embodiment of the present disclosure, starting at block 602. It will be readily appreciated that not every method step set forth in this flow diagram is always necessary, and that certain steps of the methods may be combined, performed simultaneously, in a different order, or perhaps omitted, without varying from the scope of the disclosure. FIG. 6 may be employed in whole, or in part, by information handling system 100 depicted in FIG. 1, compute device 202 depicted in FIG. 2, or any other type of system, controller, device, module, processor, or any combination thereof, operable to employ all, or portions of, the method of FIG. 6.

At block 604, a first group of keys is stored in a first slot of multiple one-time programmable slots. In certain examples, the first group of keys may include any suitable number of keys including, but not limited to, secure boot keys, HRK, and identity keys. In an example, the secured boot key may be any suitable key to validate a set of code within a memory of a security chip. The memory may be an EEPROM memory. Upon the first group of keys being written in the first slot, the first group of keys may not be overwritten or erased. In an example, the first group of keys may be associated with code for a first entity. The first entity may be an owner of the security chip, such that the first entity may control what other entities may be granted access privileges to the security chip. The other entities granted access privileges may be referred to as renters of the security chip.

At block 606, a second group of keys is stored in a second slot of the one-time programmable slots. In an example, the second group of keys may be written to, or fused, within the second slot. The second group of keys may be associated with code for a second entity. In an example, the code associated with the second entity of the second slot may replace previous code in the memory of the security chip. In response to the second group of keys being stored within the second slot, the second entity may become the renter of the security chip, such that the second entity may utilize the group of keys in the second slot to validate the code for the second entity stored in the memory. The second entity may be granted access privileges to the security chip.

At block 608, a determination is made whether the second group of keys is to be invalidated. In an example, any suitable component may execute code to perform the determination. For example, the first entity or the second entity may determine whether the second secured boot key is to be invalidated. In certain examples, the second group of keys may be invalidated for any suitable reason including, but not limited to, a security chip of a compute device needing to go through remanufacturing or decommissioning. If the second secured boot key is not to be invalidated, the flow ends at block 610.

If the second secured boot key is to be invalidated, a slot counter is updated at block 612. In an example, the slot counter may be any suitable counter including, but not limited to, a monotonic one-time programmable counter, such that the slot counter only changes in a single direction. In an example, each entry in the slot counter may be associated with a different slot of the one-time programmable slots. In this example, as the slot counter is updated, individual slots of the one-time programmable slots are invalidated on a one-by-one slot basis. In certain examples, the incrementing of the slot counter may include a one-time write to an entry associated with the second slot, which in turn is associated with the second entity. In certain examples, the second value may be stored in the entry through execution of code associated with either the first entity or the second entity. At block 614, a determination is made whether ownership of the security chip is to be passed to a third entity. If ownership of the security chip is not to be passed to the third entity, the flow ends at block 610.

If ownership of the security chip is to be passed to the third entity, a third group of keys is stored in a third slot of the one-time programmable slots of the security chip at block 616, and the flow ends at block 610. In certain examples, code associated with the second entity of the second slot may replace previous code in the memory of the security chip. In an example, in response to the third group of keys being stored in the third slot, the third entity may utilize the group of keys in the third slot to validate the code for the third entity stored in the memory. The third entity may be granted access privileges to the security chip and other components of the compute device. While writing of three groups of keys has been described with respect to FIG. 6, one of ordinary skill in the art would recognize that a substantially similar process may be applied for as many one-time programmable slots available within the PROM of the security chip.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A compute device for an information handling system, the compute device comprising:
a security chip including a programmable read only memory including:
a plurality of one-time programmable slots, including first and second slots and an owner slot;
the first slot to store a first group of keys associated with a first entity of the security chip;
the second slot to store a second group of keys associated with a second entity of the security chip; and
the owner slot to store an owner group of keys associated with an owner entity of the security chip, wherein the owner slot is not able to be invalidated; and
a one-time programmable slot counter including a plurality of entries, wherein each of the entries is associated with a different one of the one-time programmable slots, wherein the one-time programmable slot counter is only able to count in one direction, wherein a first entry of the entries is updated to invalidate the second group of keys associated with the second entity.

2. The compute device of claim 1, further comprising:
a processor of the security chip; and
a memory to communicate with the processor, the memory to store a plurality of sets of code to be executed during a boot operation of the compute device, wherein only one code of the sets of code is stored in the memory at a time.

3. The compute device of claim 2, wherein first code stored within the memory is executed to store the second group of keys within the second slot associated with the second entity.

4. The compute device of claim 3, wherein the processor further to increment the first entry to invalidate the second group of keys associated with the second entity.

5. The compute device of claim 4, wherein access privileges of the second entity are revoked based on the second slot associated with the second entity being invalidated.

6. The compute device of claim 1, further comprising:
a third slot of the one-time programmable slots;
in response to the first entry being incremented, the first entity to store a third group of keys within the third slot, wherein the third group of keys provides a third entity with access privileges to the compute device.

7. The compute device of claim 1, wherein the second entity further to increment the first entry to invalidate the second group of keys.

8. The compute device of claim 1, wherein the first group of keys is utilized to verify that first code within the memory is legitimate code of the security chip, wherein the first code is associated with the first entity.

9. The compute device of claim 8, wherein the second group of keys is utilized to verify that second code within the memory is legitimate code of the security chip, wherein the second code is associated with the second entity.

10. A method comprising:
storing a first group of keys associated with a first entity in a first slot of a plurality of one-time programmable slots, wherein the one-time programmable slots are within a programmable read only memory of a security chip of a compute device of an information handling system;
storing a second group of keys associated with a second entity in a second slot of the one-time programmable slots;
storing an owner group of keys associated with an owner entity in an owner slot of the one-time programmable slots, wherein the owner slot is not able to be invalidated;
associating each of a plurality of entries within a one-time programmable slot counter with a different one of the one-time programmable slots, wherein the one-time programmable slot counter is only able to count in one direction; and
incrementing a first entry of the entries to invalidate the second group of keys associated with the second entity.

11. The method of claim 10, further comprising:
storing, by a processor of the security chip, the second group of keys within the second slot.

12. The method of claim 11, wherein the incrementing of the first entry to invalidate the second group of keys associated with the second entity is performed by the processor of the security chip.

13. The method of claim 12, further comprising:
based on the second slot associated with the second entity being invalidated, revoking access privileges of the compute device by the second entity.

14. The method of claim 10, further comprising:
in response to the first entry being incremented, storing, by the first entity, a third group of keys within a third slot of the one-time programmable slots, wherein the third group of keys provide a third entity with access privileges to the compute device.

15. The method of claim 10, further comprising:
incrementing, by a processor of the security chip, the second entry to invalidate the second group of keys associated with the second entity.

16. The method of claim 10, further comprising:
storing first code in a memory of a compute device; and
utilizing the first groups of keys to verify that first code within the memory is legitimate code of the security chip, wherein the first code is associated with the first entity.

17. The method of claim 16, further comprising:
storing second code in a memory within a compute device; and
utilizing the second group of keys to verify that second code within the memory is legitimate code of the security chip, wherein the second code is associated with the second entity.

18. An information handling system comprising:
a compute device including:
  a memory to store a plurality of sets of code to be executed during a boot operation of the compute device, wherein only one code of the sets of code is stored in the memory at a time;
  a security chip including a processor to communicate with the memory, the security chip further including a programmable read only memory, the programmable read only memory including:
    a plurality of one-time programmable slots including first and second slots and an owner slot, the first slot to store a first group of keys for a first entity of the security chip, wherein first code within the memory is associated with the first entity, and the first code only enables the first entity to both store groups of keys in the one-time programmable slots and invalidate the groups of keys; the second slot to store a second group of keys for a second entity of the security chip, wherein second code within the memory is associated with the second entity, the second code to enable the second entity to access peripherals connected to the compute device; and the owner slot to store an owner group of keys associated with an owner entity of the security chip, wherein the owner slot is not able to be invalidated; and
    a one-time programmable slot counter including a plurality of entries, wherein each of the entries is associated with a different one of the one-time programmable slots, wherein the one-time programmable slot counter is only able to count in one direction, wherein a first entry of the entries is updated to invalidate the second group of keys associated with the second entity.

19. The information handling system of claim 18, wherein first code stored within the memory is executed by a processor of the security chip to store the second group of keys within the second slot associated with the second entity.

20. The information handling system of claim 18, further comprising:
a third slot of the one-time programmable slots;
in response to the first entry being incremented, the first entity to store a third group of keys within the third slot, wherein the third group of keys provide a third entity with access privileges to the compute device.

* * * * *